United States Patent [19]
Joesten et al.

[11] Patent Number: 5,188,777
[45] Date of Patent: Feb. 23, 1993

[54] OPAQUE FILM AND METHOD FOR ITS PREPARATION

[75] Inventors: Burdette L. Joesten, Bridgewater; Tien-Kuei Su, Belle Meade, both of N.J.

[73] Assignee: Mobil Oil Corporation, Fairfax, Va.

[21] Appl. No.: 913,325

[22] Filed: Jul. 15, 1992

Related U.S. Application Data

[62] Division of Ser. No. 788,061, Nov. 5, 1991, Pat. No. 5,134,173.

[51] Int. Cl.$^5$ ............................ B29D 9/00; C08J 9/00
[52] U.S. Cl. ..................................... 264/41; 264/45.5; 264/45.6; 264/290.2; 264/288.8; 521/51; 521/81; 521/139
[58] Field of Search ............. 264/41, 45.5, 45.6, 264/290.2; 521/139, 81

[56] References Cited
U.S. PATENT DOCUMENTS 5,134,173 7/1992 Joesten et al. .................... 521/139

*Primary Examiner*—Morton Foelak
*Attorney, Agent, or Firm*—Alexander J. McKillon; Charles J. Speciale

[57] ABSTRACT

There are disclosed opaque, biaxially oriented polymeric film structures each comprising a thermoplastic polymer matrix material, e.g., polypropylene, within which is located a stratum of voids, and positioned within each of at least a substantial number of the voids is at least one spherical void-initiating solid particle (i.e., a cavitating agent) of cross-linked polystyrene (CLPS) which is phase-distinct and incompatable with the matrix material, the volume of the particle being substantially less than the volume of the void, with one generally cross-sectional dimension of the particle at least approximating a corresponding cross-sectional dimension of the void.

Also disclosed is a method of preparing the foregoing film structure by extruding into a film a combination of the matrix material and CLPS particles dispersed therein, and biaxially orienting the film either simultaneously or sequentially.

4 Claims, No Drawings

OPAQUE FILM AND METHOD FOR ITS PREPARATION

This is a division of copending application Ser. No. 07/788,061, filed on Nov. 5, 1991, now U.S. Pat. No. 5,143,173.

BACKGROUND OF THE INVENTION

1. Field of the Invention

This invention relates to an opaque, biaxially oriented polymer film and a method for its preparation. In particular, it relates to an opaque, biaxially oriented film containing voids and its preparation from a composition comprising a film-forming polymer and void-forming microspheres dispersed therein.

Information Disclosure Statement Including Description of Related Art

The following information is disclosed in accordance with the terms of 37 CFR 1.56, 1.97 and 1.98.

U.S. Pat. No. 4,377,616, issued Mar. 22, 1983 to Ashcraft et al., discloses opaque, biaxially oriented polymer film, e.g., of isotactic polypropylene, comprising a core matrix having a stratum of voids containing spherical void-initiating solid particles The void-initiating particles can be composed of an organic polymer such as a polyamide, e.g., nylon-6, a polyester, e.g., polyethylene terephthalate acetals, or an acrylic resin, or an inorganic material such as glass, metal or ceramic.

U.S. Pat. No. 4,632,869, issued Dec. 30, 1986 to Park et al., discloses the use of polybutylene terephthalate (PBT) spherical particles as a cavitating agent for polymers such as polypropylene in the formation of opaque, biaxially oriented films. The patentees state that PBT yields certain advantages over previous cavitating agents such as nylon, e.g., its moisture sorption is lower.

U.S. Pat. No. 4,720,416, issued Jan. 19, 1988 to Duncan, discloses a pressure-sensitive label stock material having an opaque, biaxially oriented polymer film facing layer with a core layer containing voids enclosing void-initiating particles. Such particles may be composed of an organic polymer such as polybutylene terephthalate (PBT), a polyethylene terephthalate acetal, a polyamide, or an acrylic resin, or an inorganic material such as glass, metal or ceramic. The patentees state that PBT is an especially preferred void-initiating material because of its good mechanical, chemical and electrical properties. Only PBT void-initiating particles are shown in a working example.

U.S. Pat. No. 4,741,950, issued May 3, 1988 to Liu et al., discloses a surface-treated opaque laminate film comprising a core layer with voids containing void-initiating particles and two skin layers of enhanced wettability. The void-initiating particles may be of a thermoplastic resin such as PBT, polyethylene terephthalate, a polyamide, or an acrylic resin, or an inorganic material such as glass, metal or ceramic. PBT is stated to be particularly preferred as a void-initiating material because of its good mechanical, chemical and electrical properties, and is the only such material shown in a working example under the invention.

U.S. Pat. No. 4,758,462, issued Jul. 19, 1988 to Park et al., discloses an opaque, biaxially oriented film structure comprising an expanded thermoplastic polymer matrix core layer within which is located a light-absorbing pigment an a stratum of voids containing void-initiating particles. Such particles may be composed of a thermoplastic resin, e.g., a polyester such as PBT or polyethylene terephthalate, a polycarbonate, a polysulfone, an acetal, an acrylic resin, or nylon, or an inorganic material, e.g., glass, metal or ceramic.

None of the foregoing U.S. patents disclose the use o cross-linked polystyrene as a void-initiating agent.

D. Zou et al., "Model Filled Polymers. I. Synthesis of Crosslinked Monodisperse Polystyrene Beads," *Journal of Polymer Science: Part A: Polymer Chemistry*, Vol. 28, 1909-1921 (1990), disclose methods of preparation of cross-linked polystyrene beads and states that filled polymer systems are of great economic importance.

C. M. Tseng et al., "Uniform Polymer Particles by Dispersion Polymerization in Alcohol," *Polymeric Materials Science and Engineering*, Proceedings of the ACS Division of Polymeric Materials: Science and Engineering, Vol. 54, Spring Meeting 1986, New York, NY (American Chemical Society, 1986), 362-366, disclose the preparation of uniform polystyrene particles in the 1-10 micron range by dispersion polymerization in ethyl alcohol.

Neither of the foregoing two references teach that the polystyrene disclosed could be used as a void-initiating agent in the formation of opaque, oriented films.

SUMMARY OF THE INVENTION

In accordance with this invention, there are provided opaque, biaxially oriented polymeric film structures each comprising a thermoplastic polymer matrix material within which is located a stratum of voids, and positioned within each of at least a substantial number of the voids is at least one spherical void-initiating solid particle (i.e., a cavitating agent) of cross-linked polystyrene (CLPS) which is phase-distinct and incompatible with the matrix material, the volume of the particle being substantially less than the volume of the void, with one generally cross-sectional dimension of the particle at least approximating a corresponding cross-sectional dimension of the void.

Also included within the scope of the invention is the foregoing film structure having on at least one of its surfaces a void-free thermoplastic skin layer of a thickness such that the outer surface thereof does not manifest any substantial surface irregularities of the core layer.

The invention also encompasses a method for preparing a biaxially oriented opaque film by extruding into a film a resin combination comprising a thermoplastic polymer matrix within which is dispersed, as a distinct phase, a multiplicity of small spherical solid particles of cross-linked polystyrene, and preparing a biaxially oriented opaque film by extruding the foregoing resin combination into a film and thereafter biaxially orienting the film either simultaneously or sequentially.

The use of CLPS void-initiating particles (i.e., cavitating agent) in forming the opaque film of this invention results in films having unexpectedly better properties, e.g., higher opacity indicated by lower light transmission, higher loft as indicated by higher optical gauge thickness and lower density, and greater stiffness, than when equal or greater amounts of other commonly used cavitating agents, e.g., polybutylene terephthalate (PBT), are used. The CLPS particles also have significantly lower levels of moisture sorption than several other organic polymers disclosed in the art for the sam purpose and are less brittle than the glass particles which have also been disclosed.

DETAILED DESCRIPTION OF THE INVENTION

The thermoplastic matrix polymer, of which the opaque film of this invention is composed, can be any thermoplastic polymer which is incompatible with the CLPS particles and which can be oriented in film form. By incompatible is meant that the two materials will maintain their identities when they are mixed above the melting point of the matrix polymer. Examples of such thermoplastic matrix polymers include the polyolefins, e.g., polyethylene, polypropylene, polybutylene, etc. Distinct species of these materials are also contemplated such as copolymers of ethylene with alpha-olefins, e.g., butene, hexene etc., random copolymers of propylene with another olefin, e.g., ethylene, butene, hexene, etc., and any blend or mixtures of the same. Other contemplated matrix resins include polystyrene, its blends with polyolefins, and polyethylene terephthalate. Particularly preferred as the matrix polymer is isotactic or stereospecific polypropylene.

The CLPS spherical void-initiating particles are generally in the size range of about 0.1 to 10 microns in diameter and are often referred to as "microspheres." They are composed of polystyrene cross-linked with about 0.1 to 20 wt. % of a polyunsaturated cross-linking comonomer, e.g., divinylbenzene and 1,4-hexadiene. Divinylbenzene is the preferred cross-linking comonomer. The CLPS microspheres may be produced by any of various methods known in the art, e.g., by emulsion or dispersion polymerization in aqueous or alcoholic media as disclosed, for example, in the Zou et al. or Tseng et al. cited hereinbefore, the entire disclosures of which are incorporated by reference.

The composition comprising the matrix polymer and the CLPS microspheres suitable for extrusion into a film may be prepared by thoroughly mixing the constituent materials using any means for this purpose known in the art at a temperature above the melting point of the matrix polymer. Such mixing may be conveniently accomplished on the extruder utilized to form the initial film which is subsequently biaxially oriented. In many instances, the entire amounts of matrix polymer and CLPS in the composition to be extruded may be mixed in the first instance. However, it is also possible to employ a master batch technique as disclosed in previously cited U.S. Pat. No. 4,377,616, wherein a master batch is first prepared containing matrix polymer and a much larger amount of CLPS than in the mixture to be extruded. Appropriate dilution of the system is then made by adding additional matrix polymer until the desired proportions are obtained.

The CLPS microspheres can be present, for example, in up to about 20% by weight of the matrix film, preferably from about 2 to about 10% by weight. When a master batch precursor composition is made for ultimate dilution with more matrix polymer for a final film, the master batch can contain as much CLPS as can practically be dispersed in the thermoplastic matrix polymer in spherical subdivided particles of a size ranging from about 0.1 to about 10 microns. With little difficulty up to about 30% by weight of the CLPS can be dispersed, in this size range, in the matrix resin. It is preferred that the degree of opacity of the oriented film be less than 70% light transmission. The opacity of the film can be enhanced by the inclusion in the film of from about 1 to 3% by weight of a pigment, such as $TiO_2$, colored oxides and the like. The pigment should be in a particle size such that it does not contribute in any material sense to void initiation in the matrix resin.

The general method of forming the opaque oriented film of the present invention is accomplished by slot extruding a film of the resin composition (matrix plus CLPS) and thereafter sequentially biaxially orienting the film. During the orientation a stratum of voids is formed in the matrix polymer. Since the CLPS particles are incompatible with the matrix material, during machine direction-orientation each sphere tends to create a streamlined void. During subsequent transverse orientation, the transverse dimension of this void is correspondingly increased. These steps cause the film to turn a bright white pearlescent opaque color. In some instances, in order to avoid the formation of an irregular surface as a result of the spheres and the cavitated condition of the film, a co-extruded surface layer can be formed on one or both surfaces of the cavitated film. This co-extruded film can be transparent or pigmented and of the same or different material as the matrix resin. The different resin may be chosen for particular characteristics, for example, heat sealability, printability, machinability, etc. When employing a surface or skin layer or layers, it is preferred that the core thickness be from about 30 to 95% of the overall structure. Conversely, it is preferred that the combined skin thickness be about 5 to about 70% of the overall film thickness. When desired or necessary, the skin layers can be sufficiently thick so that the outer surfaces thereof do not manifest any irregularities or surface projections of the core material.

The following examples further illustrate the invention.

EXAMPLE 1

A mixture of 95.5 parts by weight of isotactic polypropylene (Amoco 6317), having a melting point of 165° C. and a flow rate of 2.7 g/10 min. (ASTM D-1238, Condition 230° C./2.16 kg), and 4.5 parts of a CLPS having an average particle size of microns and containing about 20 wt. % of copolymerized divinylbenzene, was prepared in a 2½ inch main extruder at a temperature above the melting point of the polypropylene. The mixture was co-extruded with two streams of the same molten polypropylene but containing no CLPS, provided by two 1½ inch satellite extruders, through a 0.350 inch by 12 inch slot die, cast onto a chill roll and then quenched into a water bath to provide an unoriented sheet containing a polypropylene/CLPS core layer having a thickness of 70% of the total film thickness, and two polypropylene skin layers, one on each side of the core layer, containing no CLPS and each having a thickness of 15% of the total film thickness. The cooled polymer sheet was reheated to 240° F. and stretched five times in the machine direction (MD) by using differential speed rolls. Following MD orientation, the polymer film was fed into an oven for reheating to 275° F. and stretched seven times along the transverse direction (TD) by using a tenter frame, then annealing. The biaxially oriented polypropylene film exited from the oven and was trimmed and wound onto rolls.

The opaque, biaxially oriented film was found to have a light transmission of 30%, an optical gauge thickness of 1.86 mils, a density of 0.44 g/cc and a stiffness (ASTM D-2923) of 37.6 g/4 in. in the machine direction (MD) and 46.3 g/4 in. in the transverse direction (TD).

EXAMPLE 2

The procedure of Example 1 was followed except that the mixture extruded to form the core layer contained 97 parts by weight of polypropylene and 3 parts by weight of CLPS. The opaque, biaxially oriented film had a light transmission of 38% an optical gauge thickness of 1.69 mils, a density of 0.50 g/cc and a stiffness of 25.7 g/4 in. (MD) and 40.3 g/4 in. (TD).

The percent light transmission given in the foregoing examples is measured using a Gardner Hazemeter calibrated to "100% Transmission" with all light trapped in the hazemeter and "0% Transmission" with all light blocked from entering sphere. All measurements are made with sphere in cocked position (without light trap). Sample is inserted and value read as % light transmission.

It is to be understood that the biaxial orientation of the film can be simultaneously achieved using a tenter apparatus.

We claim:

1. A process for preparing a biaxially oriented opaque film comprising;
   a) providing a resin combination comprising a thermoplastic polymer matrix having dispersed therein as distinct phases a multiplicity of small spherical solid particles of cross-linked polystyrene;
   b) forming an unoriented film of said resin combination; and
   c) biaxially orienting said film to an extent sufficient to opacify the same and the formation of voids therein.

2. The process of claim 1 wherein a void-free thermoplastic skin layer is formed on at least one surface of said unoriented film which is thereafter biaxially oriented.

3. The process of claim 2 wherein said skin layer is transparent.

4. The process of claim 3 wherein said matrix polymer is polypropylene.

* * * * *